United States Patent
Wang et al.

(10) Patent No.: US 8,072,674 B2
(45) Date of Patent: Dec. 6, 2011

(54) ELECTRO-PHORETIC DISPLAY AND FABRICATING METHOD THEREOF

(75) Inventors: Yi-Ching Wang, Hsinchu (TW); Su-Cheng Liu, Hsinchu (TW); Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 134 days.

(21) Appl. No.: 12/399,008

(22) Filed: Mar. 5, 2009

(65) Prior Publication Data

US 2010/0134871 A1 Jun. 3, 2010

(30) Foreign Application Priority Data

Dec. 1, 2008 (TW) .............................. 97146634 A (51) Int. Cl.
*G02B 26/00* (2006.01)
*G09G 3/34* (2006.01)

(52) U.S. Cl. .......... 359/296; 345/107; 345/55; 345/204; 445/24; 204/606

(58) Field of Classification Search .................. 359/296; 345/55, 107, 173, 175, 204; 445/24; 204/484, 204/606; 257/40, E51.006
See application file for complete search history.

(56) References Cited

U.S. PATENT DOCUMENTS

| | | | |
|---|---|---|---|
| 6,392,786 B1 * | 5/2002 | Albert ........................... 359/296 |
| 6,721,084 B2 * | 4/2004 | Kawai ........................... 359/296 |
| 6,729,924 B2 * | 5/2004 | Ikeda et al. ....................... 445/24 |
| 6,741,386 B2 * | 5/2004 | Minami ......................... 359/296 |
| 6,862,129 B2 * | 3/2005 | Matsuda et al. ............... 359/296 |
| 6,922,275 B2 * | 7/2005 | Ikeda ............................. 359/296 |
| 7,009,756 B2 * | 3/2006 | Kishi et al. ..................... 359/296 |
| 7,019,889 B2 * | 3/2006 | Katase ........................... 359/296 |
| 7,359,110 B2 * | 4/2008 | Katase ........................... 359/296 |
| 7,499,209 B2 * | 3/2009 | Chopra et al. ................. 359/296 |
| 7,612,760 B2 * | 11/2009 | Kawai ........................... 345/107 |
| 7,649,675 B2 * | 1/2010 | Chopra et al. ................. 359/296 |
| 7,706,051 B2 * | 4/2010 | Hattori et al. ................. 359/296 |
| 2005/0099559 A1 | 5/2005 | Lee et al. |
| 2008/0079688 A1 * | 4/2008 | Yang et al. .................... 345/107 |

FOREIGN PATENT DOCUMENTS

CN 201069507 Y 6/2008
CN 2008101857454 4/2011

* cited by examiner

*Primary Examiner* — Loha Ben
(74) *Attorney, Agent, or Firm* — Chun-Ming Shih (57) ABSTRACT

In an electro-phoretic display and a fabricating method thereof, the electro-phoretic display is fabricated by the steps: forming a plurality of pixel electrodes arranged in matrix form on a first substrate; disposing a plurality of electro-phoretic displaying units including a plurality of colored charged particles, wherein each pixel electrode is corresponding to at least one of the electro-phoretic displaying units having the colored charged particles with the same color; forming a transparent electrode on a second substrate; and disposing the second substrate on the electro-phoretic displaying units to positioning the transparent electrode between the second substrate and the electro-phoretic displaying units. The electro-phoretic display can select a part of the pixel electrodes for being driven according to the color of the image being displayed, so that the electro-phoretic display may have an improved chromatic performance.

20 Claims, 12 Drawing Sheets

ELECTRO-PHORETIC DISPLAY AND FABRICATING METHOD THEREOF

BACKGROUND

This application claims priority to a Taiwan application No. 097146634 filed Dec. 1, 2008.

1. Field of the Invention

The present invention is related to a display and a fabricating method thereof, and more particular to an electro-phoretic display and a fabricating method thereof.

2. Description of the Related Art

Since the flexible display not only has advantages of light weight and thin thickness, but also has advantages of flexibility and is not easy to be broken. Therefore, the development of the flexible display panel has become increasingly important. Nowadays, the popular flexible display is the electro-phoretic display (so-called EPD). In the electro-phoretic display panel, the distribution of charged particles is controlled based on electric field to change the reflectivity of the display region with respect to the ambient light so as to display pictures. According to the display theory, the electro-phoretic display panel has bistability and needs no additional light source to illuminate, so it fills the bill of high power-saving in present flexible display panel.

Figure 1:
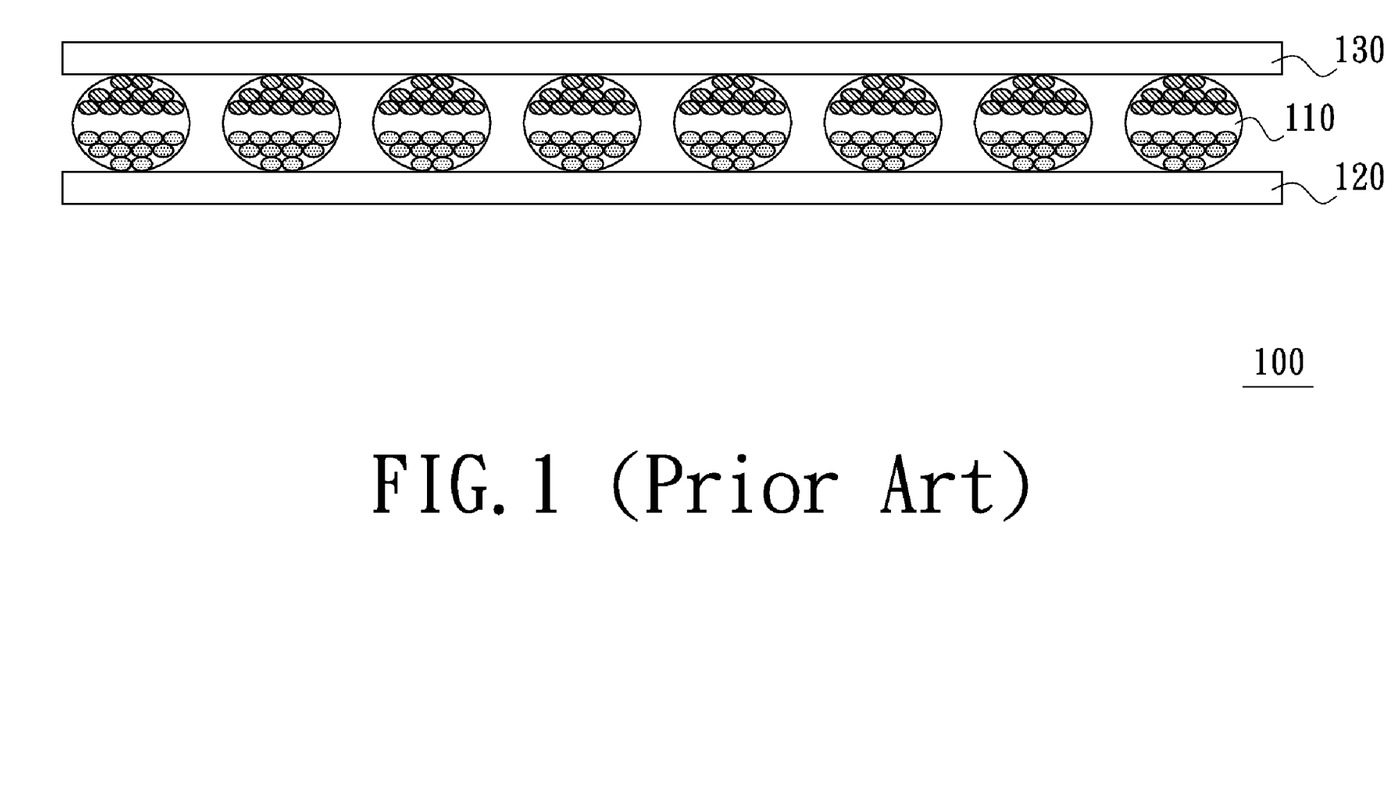
FIG. 1 is a schematic cross-sectional view of a conventional electro-phoretic layer.
Figure 2:
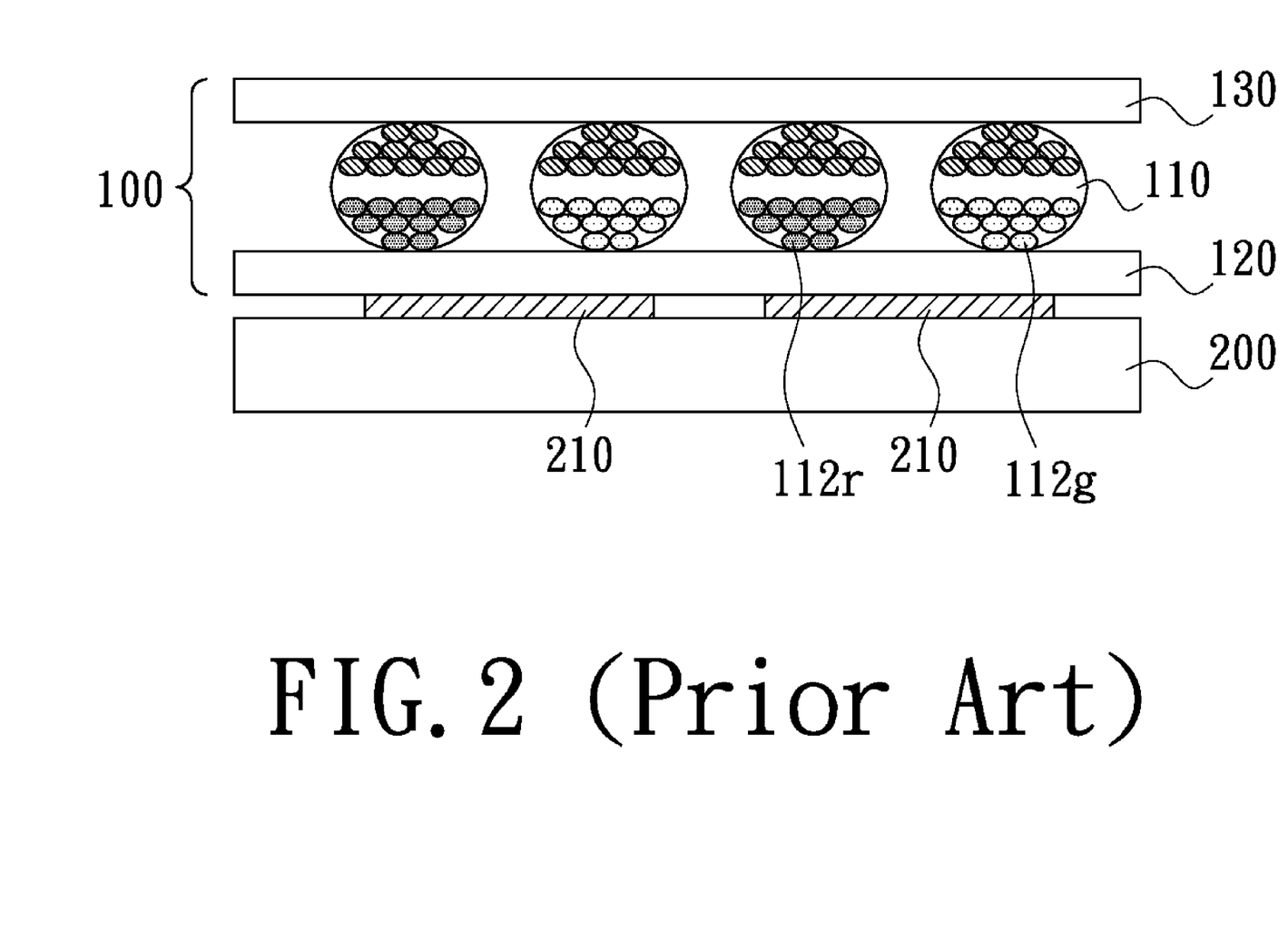
FIG. 2 is a schematic cross-sectional view of a portion of a conventional electro-phoretic display.

FIG. 1 is a schematic cross-sectional view of a conventional electro-phoretic layer. FIG. 2 is a schematic cross-sectional view of a portion of a conventional electro-phoretic display. Referring FIG. 1 and FIG. 2, during the fabricating process of the conventional electro-phoretic display, a plurality of electro-phoretic displaying units 110 such as, electro-phoretic microcapsules or electro-phoretic microcups are disposed between a transparent substrate 120 and a transparent substrate 130 to form an electro-phoretic film 100, and then the electro-phoretic film 100 is smoothly attached on an active elements array substrate 200 as an electro-phoretic layer.

In addition, for considering the brightness and the colorized of images displayed by the electro-phoretic display, the method of using the colored charged particles in the electro-phoretic displaying units 110 to display colored images is researched and developed by every manufacturer. However, since the interval between two adjacent electro-phoretic displaying units 110 in the electro-phoretic film 100 is different from the interval between two pixel electrodes 210 of the active elements array substrate 200, the electro-phoretic displaying units 110 with different colors are driven at the same time.

As shown in FIG. 2, if a portion of the electro-phoretic displaying unit 110 having the red charged particles 112r and a portion of the electro-phoretic displaying unit 110 having the green charged particles 112g correspond to the same pixel electrode 210, the color of the image displayed by applying a driving voltage to the pixel electrode 210 is red, green and mixing color thereof, not purely red or green. Accordingly, the chromatic performance of the images displayed by the conventional electro-phoretic display is undesired.

BRIEF SUMMARY

Accordingly, this invention provides an electro-phoretic display wherein the electro-phoretic displaying units with particular color may be selected and driven for displaying the images with single specific color.

This invention further provides a fabricating method of an electro-phoretic display for manufacturing the electro-phoretic display which can display images with a particular color.

This invention provides an electro-phoretic display comprising a first substrate, a plurality of pixel electrodes, a plurality of electro-phoretic displaying units, a second substrate and a transparent electrode. The pixel electrodes are arranged in matrix form on the first substrate. Each electro-phoretic displaying unit is disposed on one of the pixel electrodes and comprises a plurality of colored charged particles. In each electro-phoretic displaying unit disposed on the same pixel electrode, the colors of the colored charged particles are the same. The second substrate is disposed above the electro-phoretic displaying units. The transparent electrode is disposed on the second substrate and between the second substrate and the electro-phoretic displaying units.

In one embodiment of this invention, each pixel electrode is corresponding to the electro-phoretic displaying units having the colored charged particles with the same color.

In one embodiment of this invention, each electro-phoretic displaying unit is located on at least one of the electro-phoretic displaying units.

In one embodiment of this invention, the electro-phoretic displaying units comprise electro-phoretic microcups or electro-phoretic microcapsules.

In one embodiment of this invention, the electro-phoretic display further comprises a barrier structure disposed on the first substrate and partitioning a plurality of containing spaces thereon. Each electro-phoretic microcapsule is disposed in one of the containing spaces correspondingly.

In one embodiment of this invention, the barrier structure extends from the first substrate to the second substrate.

In one embodiment of this invention, the barrier structure is made of light-shielding materials.

In one embodiment of this invention, the electro-phoretic display further comprises a light-shielding layer disposed on the second substrate. The light-shielding layer has a plurality of openings filled by the transparent electrode and each opening corresponds to one of the electro-phoretic displaying units.

In one embodiment of this invention, the colored charged particles may be red, green or blue charged particles and each electro-phoretic displaying unit further comprises a plurality of black charged particles.

In one embodiment of this invention, the colored charged particles may be cyan, yellow or magenta charged particles and each electro-phoretic displaying unit further comprises a plurality of white charged particles.

In one embodiment of this invention, the first substrate and the second substrate are respectively a glass substrate or a flexible substrate.

This invention provides a fabricating method of an electro-phoretic display. Firstly, a plurality of pixel electrodes are formed on a first substrate in a matrix form, and then a plurality of electro-phoretic displaying units comprising a plurality of colored charged particles are disposed on the pixel electrodes. Each pixel electrode corresponds to at least one of the electro-phoretic displaying units having the colored charged particles with the same color. A transparent electrode is formed on a second substrate. The second substrate is disposed on the electro-phoretic displaying units to positioning the transparent electrode between the second substrate and the electro-phoretic displaying units.

In one embodiment of this invention, the method of disposing the electro-phoretic displaying units on the pixel electrodes comprises the step of disposing the electro-phoretic displaying units with the colored charged particles having the same color on the pixel electrodes, respectively.

In one embodiment of this invention, the method of disposing the electro-phoretic displaying units on the pixel electrodes comprises the step of disposing each electro-phoretic displaying unit on at least one of the pixel electrodes.

In one embodiment of this invention, the electro-phoretic displaying units comprise electro-phoretic microcapsules and the method of fabricating the electro-phoretic display further comprises the step of forming a barrier structure on the first substrate to partition a plurality of containing spaces thereon before disposing the electro-phoretic displaying units on the pixel electrodes,. Each electro-phoretic microcapsule is disposed in one of the containing spaces correspondingly.

In one embodiment of this invention, the barrier structure extends from the first substrate to the second substrate.

In one embodiment of this invention, the barrier structure is made of light-shielding materials.

In one embodiment of this invention, a light-shielding layer having a plurality of openings is formed on the second substrate before forming the transparent electrode on the second substrate, and the openings are filled by the transparent electrode subsequently formed. When the second substrate is disposed above the electro-phoretic displaying units, each opening corresponds to one of the electro-phoretic displaying units.

In one embodiment of this invention, the colored charged particles may be red, green or blue charged particles and each electro-phoretic displaying unit further comprises a plurality of black charged particles.

In one embodiment of this invention, the colored charged particles may be cyan, yellow or magenta charged particles and each electro-phoretic displaying unit further comprises a plurality of white charged particles.

The electro-phoretic display of this invention can select some of the pixel electrodes for being driven according to the color of the image being displayed. Therefore, if the electro-phoretic displaying units with the colored charged particles having the same color are selected, the electro-phoretic display can display single-color images. Accordingly, the electro-phoretic display of this invention may have an improved chromatic performance.

In order to make the aforementioned and other objects, features and advantages of this invention comprehensible, preferred embodiments accompanied with figures are described in detail below. It is to be understood that both the foregoing general description and the following detailed description are exemplary, and are intended to provide further explanation of this invention as claimed.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 3A:
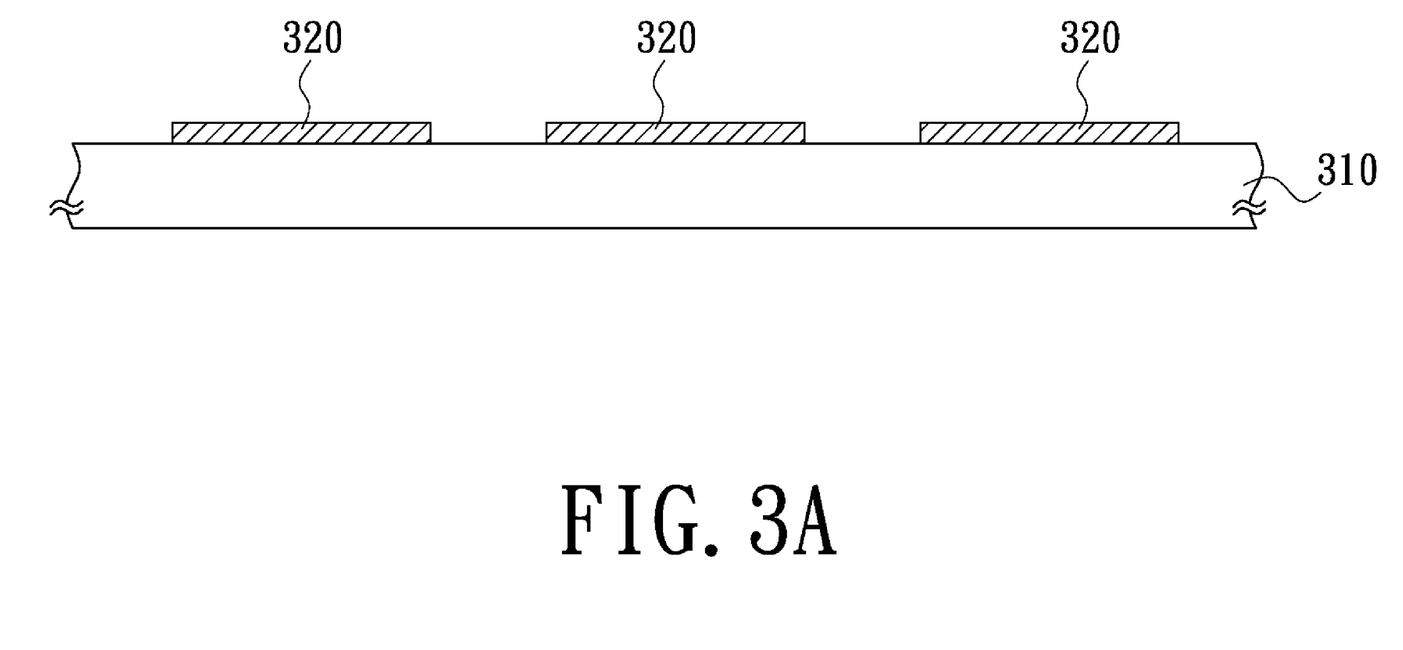
FIG. 3A to 3D are schematic cross-sectional views illustrating the process flow for fabricating the electro-phoretic display according to one embodiment of this invention.

The fabricating process of an electro-phoretic display in this invention will be described below. FIG. 3A to 3D are schematic cross-sectional views illustrating the process flow for fabricating the electro-phoretic display according to one embodiment of this invention. Referring to FIG. 3A, a plurality of pixel electrodes 320 are formed in a matrix form on a first substrate 310. The first substrate may be a glass substrate or a flexible plastic substrate.

Figure 4:
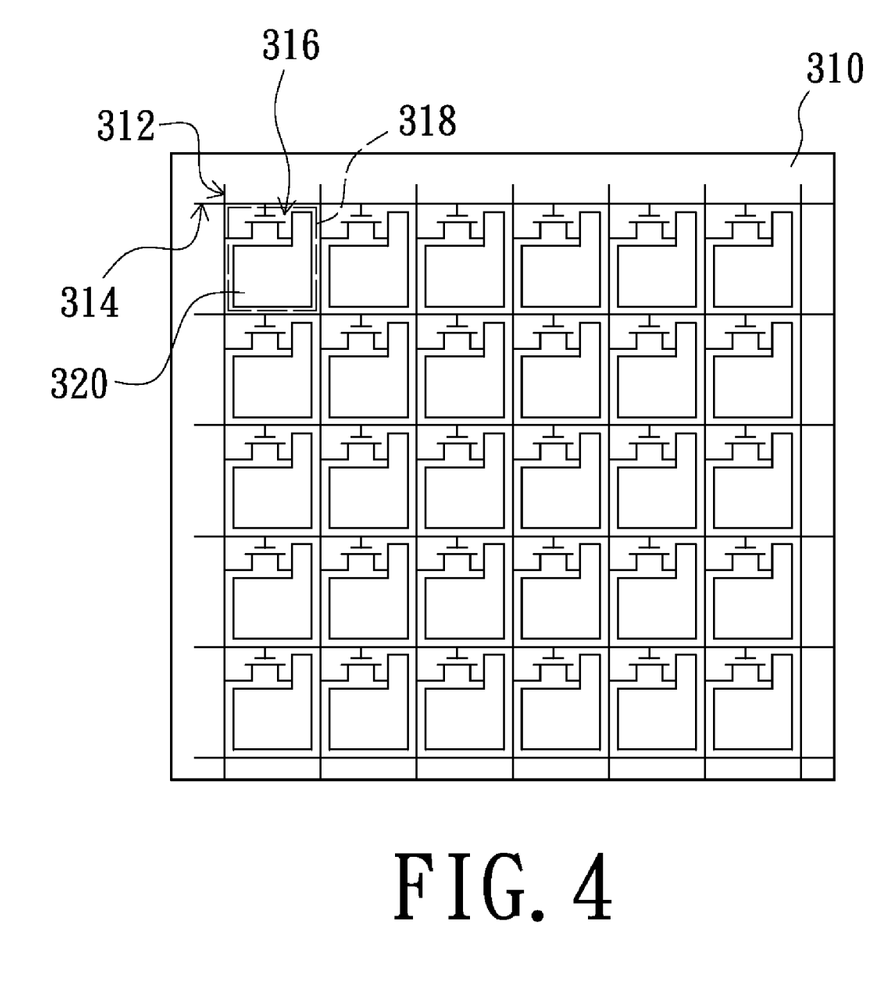
FIG. 4 is a schematic view of a semi-finished electrophoretic display of one embodiment of this invention.

Specifically, a thin film transistors array may be used as the driving devices of the electro-phoretic display in this embodiment. Therefore, a plurality of data lines 312, a plurality of scan lines 314 and a plurality of thin film transistors 316 are disposed on the first substrate 310 before forming the pixel electrode 320, as shown in FIG. 4. The data lines 312 and the scan lines 314 are partitioning a plurality of pixel regions 318 on the first substrate 310. Each thin film transistor 316 is disposed to the corresponding pixel region 318 and is electrically connected correspondingly to the data line 312 and the scan line 314. Each pixel electrode 320 is disposed in the corresponding pixel region 318 and is electrically connected to the data line 312 via the thin film transistor 316.

It should be noted that although the embodiment illustrates the active matrix electro-phoretic display, the scope of this invention is not limited hereto. It is apparent to those skilled in the art that the electro-phoretic display of this invention may be passive matrix driving display.

Figure 3B:
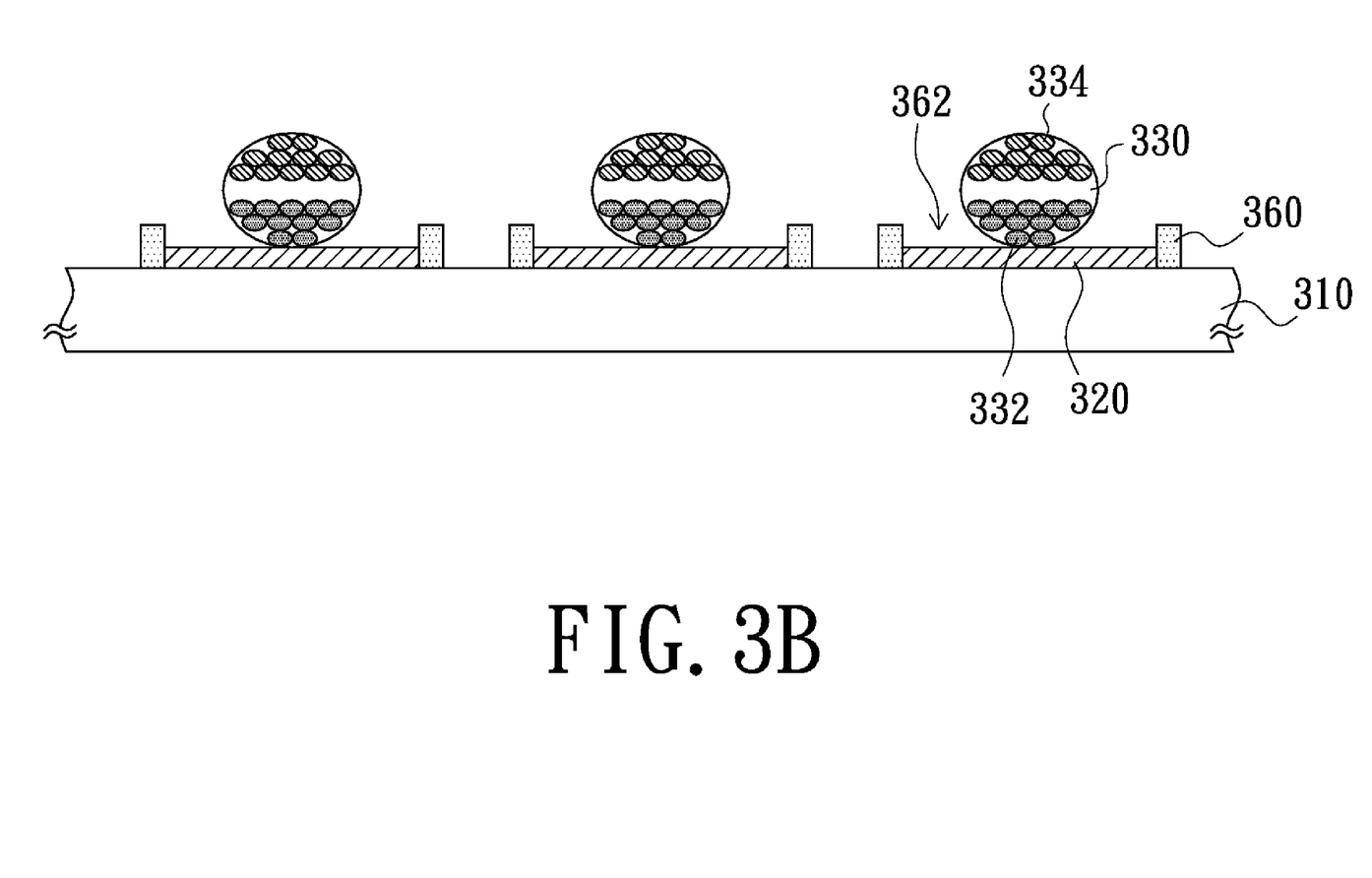

Referring FIG. 3B, a plurality of electro-phoretic displaying units 330 are disposed on the pixel electrodes 320, wherein each electro-phoretic displaying unit 330 may be electro-phoretic microcapsule or electro-phoretic microcup. The electro-phoretic displaying units 330 in the form of microcapsule are taken as an example for illustration in the embodiment, this invention should not be limited hereto.

Figure 5:
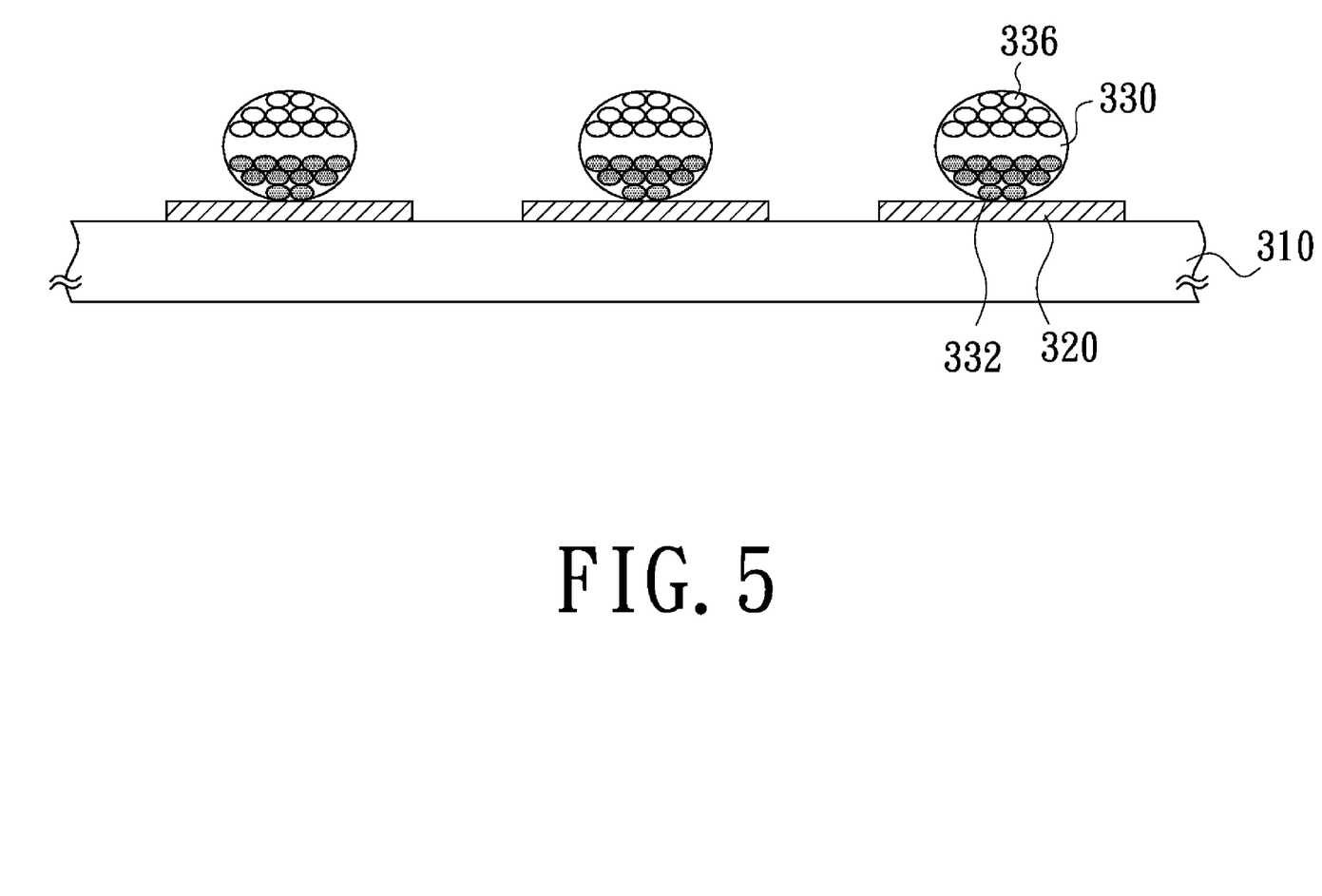
FIG. 5 is a schematic view of a semi-finished electrophoretic display of one embodiment of this invention.

In detail, each electro-phoretic displaying unit 330 comprises a plurality of colored charged particles 332, wherein the colored charged particles 332 may be red, green or blue charged particles in this embodiment. In addition to the colored charged particles 332, the electro-phoretic displaying units 330 of this embodiment further comprise a plurality of black charged particles 334. Moreover, in another embodiment of this invention, the colored charged particles 332 in each electro-phoretic displaying unit 330 may be cyan, yellow or magenta charged particles, as shown in FIG. 5. In addition to the colored charged particles 332, the electro-phoretic displaying units 330 of this embodiment further comprise a plurality of white charged particles 336.

Figure 6:
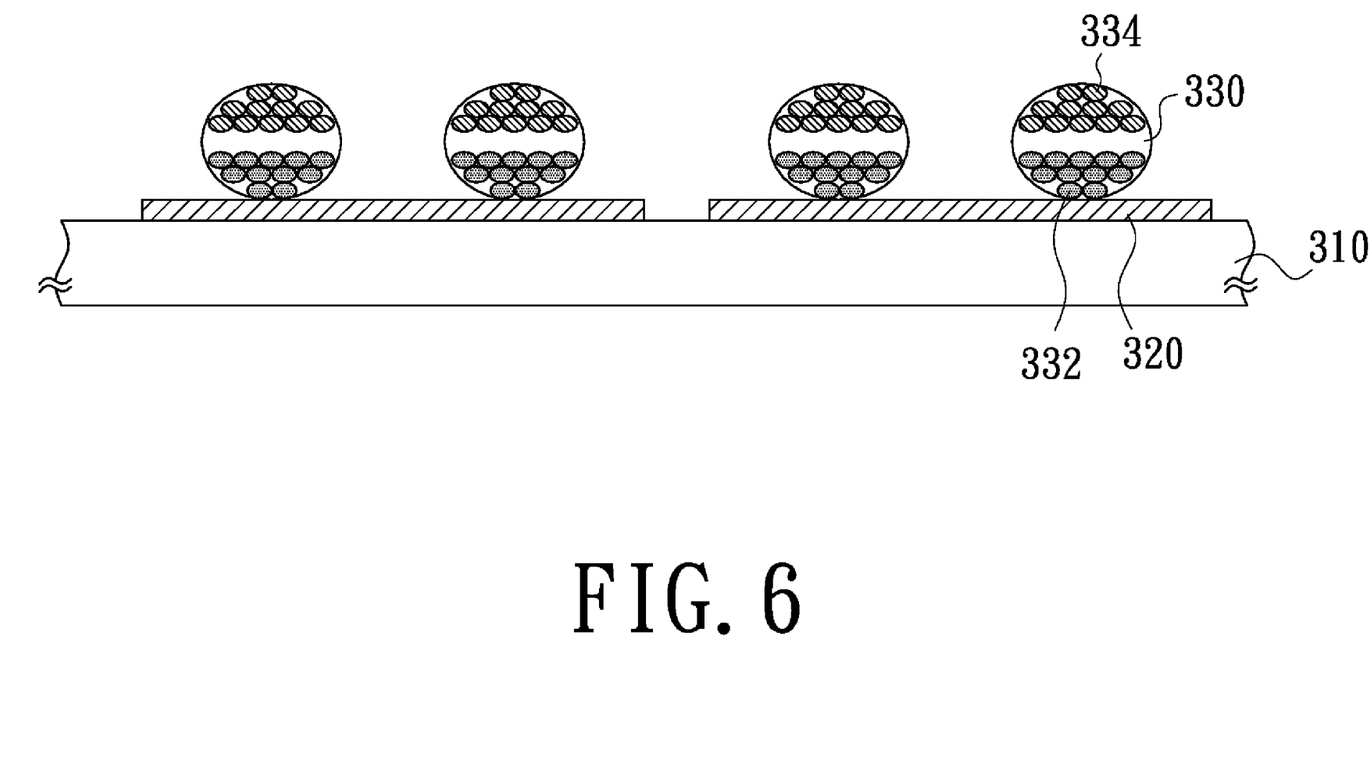
FIG. 6 is a schematic view of a semi-finished electrophoretic display of one embodiment of this invention.

It should be noted that the electro-phoretic displaying units 330 having the colored charged particles 332 with the same color are respectively disposed on each pixel electrode 320 in the present embodiment. Specifically, on each pixel electrode 320, only one electro-phoretic displaying unit 330 is disposed (as shown in FIG. 3B). Moreover, a plurality of the electro-phoretic displaying units 330 may be disposed on each pixel electrode 320, wherein the electro-phoretic displaying units 330 comprises the colored charged particles 322 with the same color, as shown in FIG. 6. In other words, each pixel electrode 320 is used for driving the electro-phoretic displaying units 330 comprising the colored charged particles 322 with a particular color.

It should be noted that the number of the electro-phoretic displaying units 330 disposed on each pixel electrode 320 depends on the size ratio of the pixel electrode 320 to the electro-phoretic displaying units 330 disposed thereon. Those skilled in the art can adjust the number according to the actual requirement, and the modifications also fall in the scope of this invention.

Figure 7:
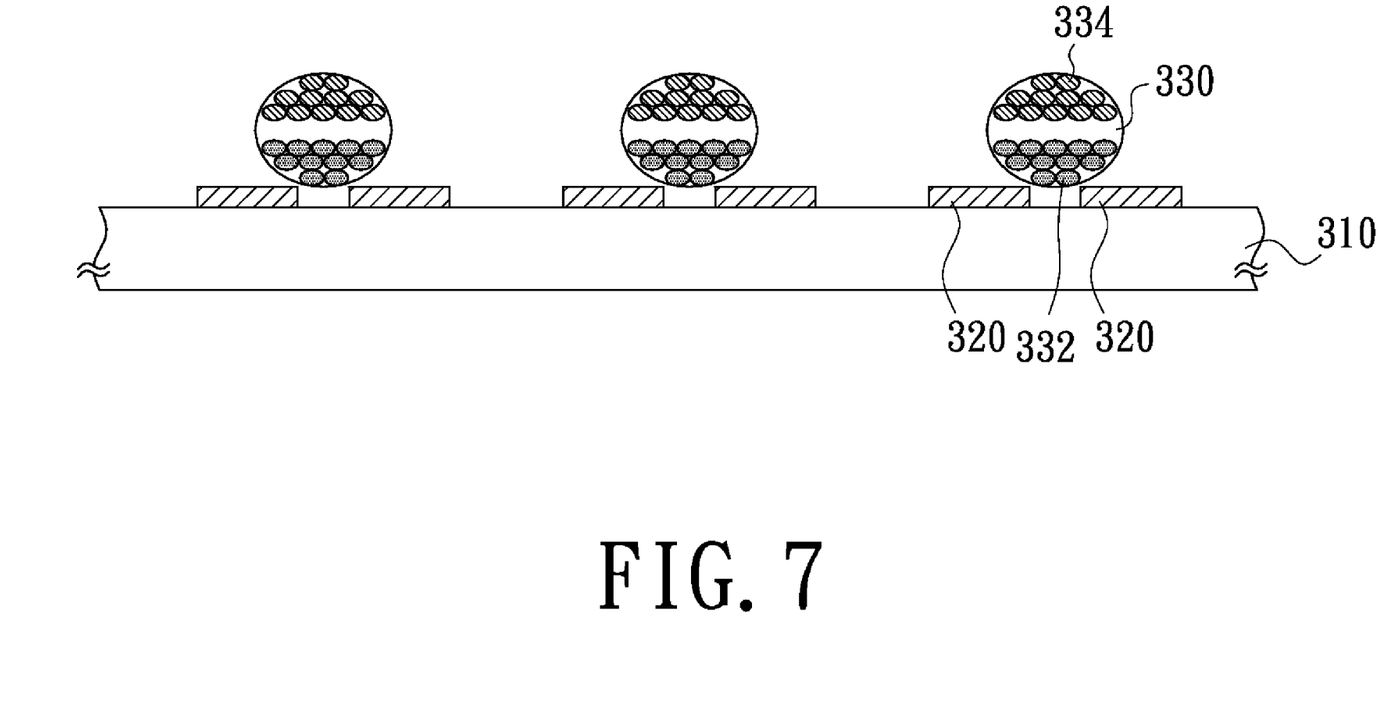
FIG. 7 is a schematic view of a semi-finished electrophoretic display of one embodiment of this invention.

In another embodiment of this invention, each electro-phoretic displaying unit 330 may be disposed corresponding to a plurality of pixel electrodes 320, such as corresponding to two pixel electrodes 320 as shown in FIG. 7. In other words, each electro-phoretic displaying unit 330 is driven by two pixel electrodes 320.

Referring to FIG. 3B, in the embodiment, a barrier structure 360 is formed for partitioning a plurality of containing spaces on the first substrate 310 before disposing the electro-phoretic displaying units 330 on the pixel electrodes 320, and then each electro-phoretic displaying unit 330 is disposed into one of the containing spaces. Therefore, each electro-phoretic displaying unit 330 may have a fixed position on the first substrate 310.

Figure 3C:
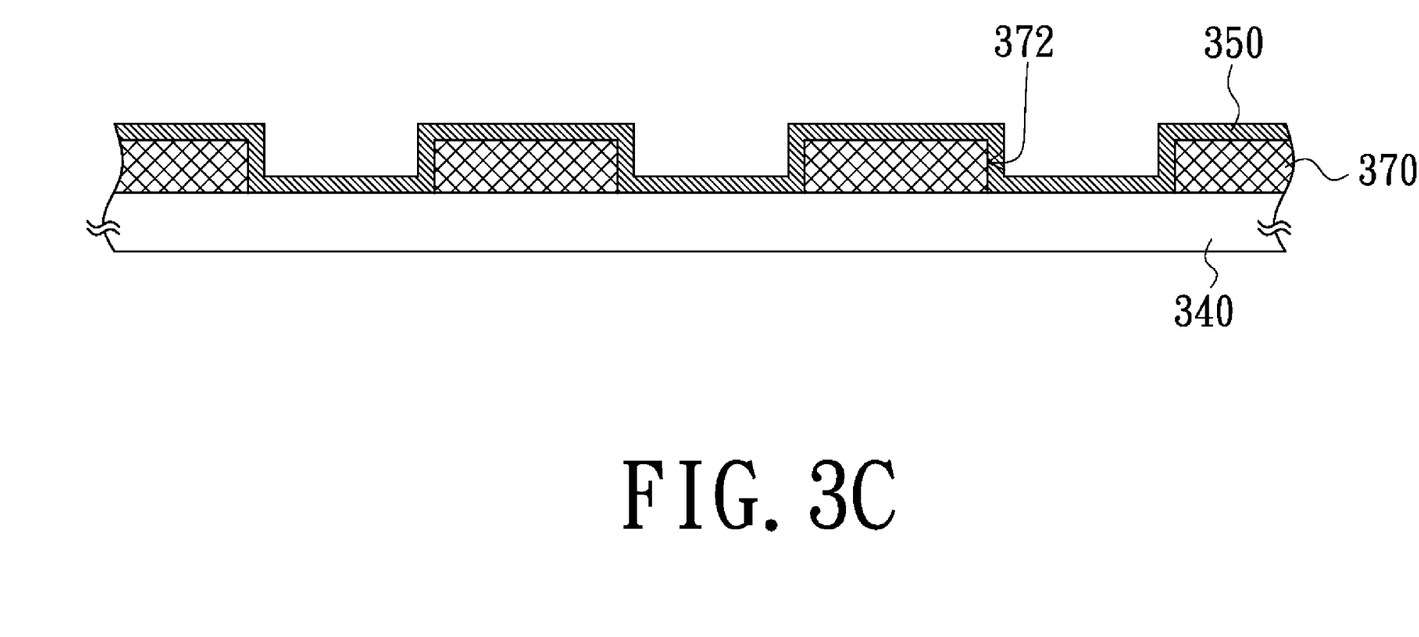

Referring to FIG. 3C, a transparent electrode 350 is formed on the second substrate 340 made of glass substrate or plastic substrate with flexibility. Specifically, a light-shielding layer 370 with a plurality of openings 372 may be formed before forming the transparent electrode 350 on the second substrate 340. Therefore, the transparent electrode 350 formed on the light-shielding layer 370 is fill into the openings 372. The light-shielding layer 370 may made of resin, graphite, electroless plating nickel, chromium or other light-shielding materials.

Figure 3D:
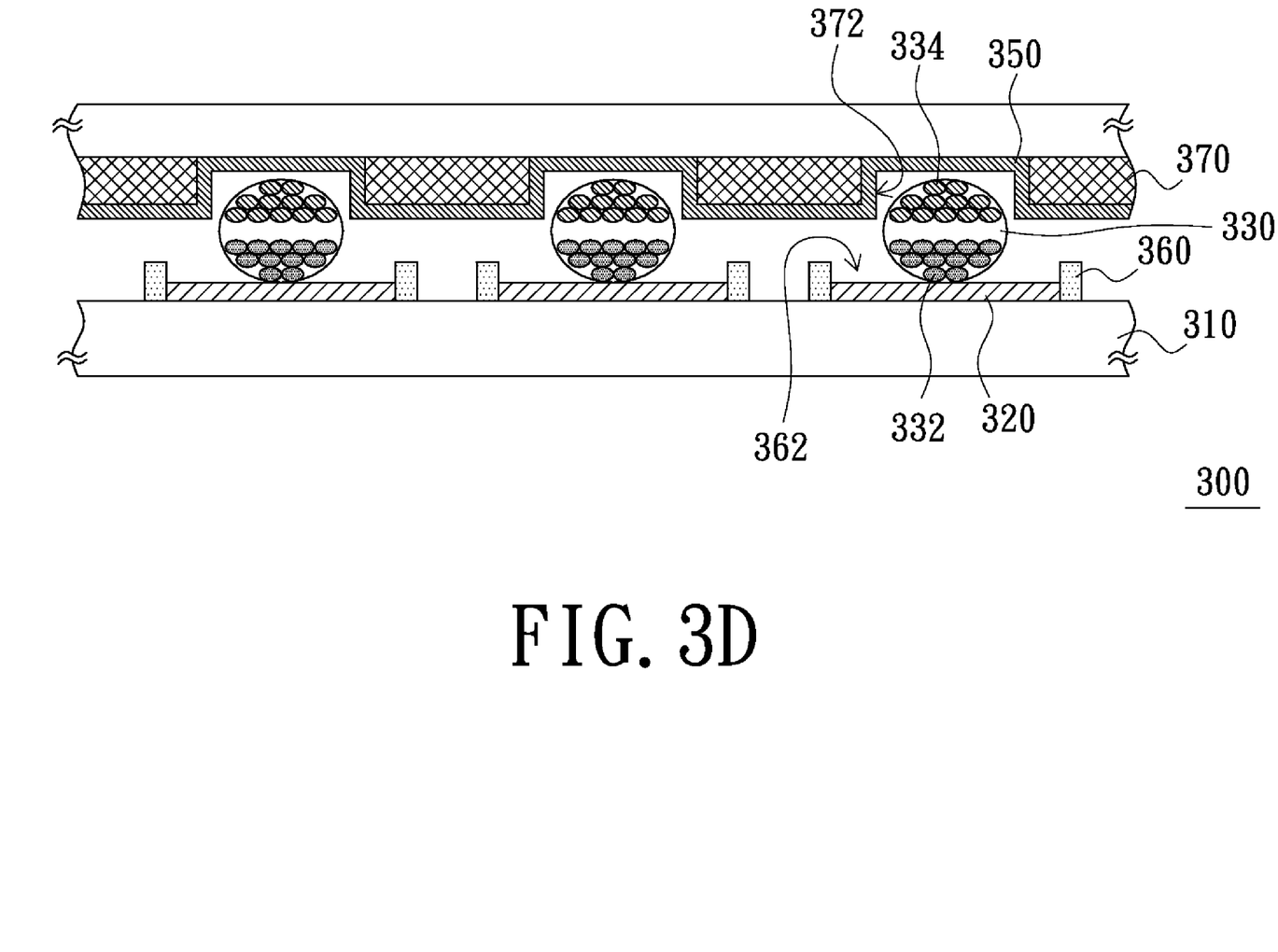

Referring to FIG. 3D, the second substrate 340 is disposed on the electro-phoretic displaying units 330 and the transparent electrode 350 is positioned between the second substrate 340 and the electro-phoretic displaying units 330. The fabricating process of the electro-phoretic display 300 of the embodiment is substantially finished at this time. The openings 372 of the light-shielding layer 370 are corresponding to the containing spaces 362 partitioned by the barrier structure 360, respectively. In the other words, each electro-phoretic displaying unit 330 is located in one of the containing spaces 362 and corresponding to one of the openings 372 of the light-shielding layer 370. Therefore, it may prevent the light emitted by the different electro-phoretic displaying units 330 from mixing to a mixing-light and the contrast of the electro-phoretic display 300 may be improved.

Figure 8:
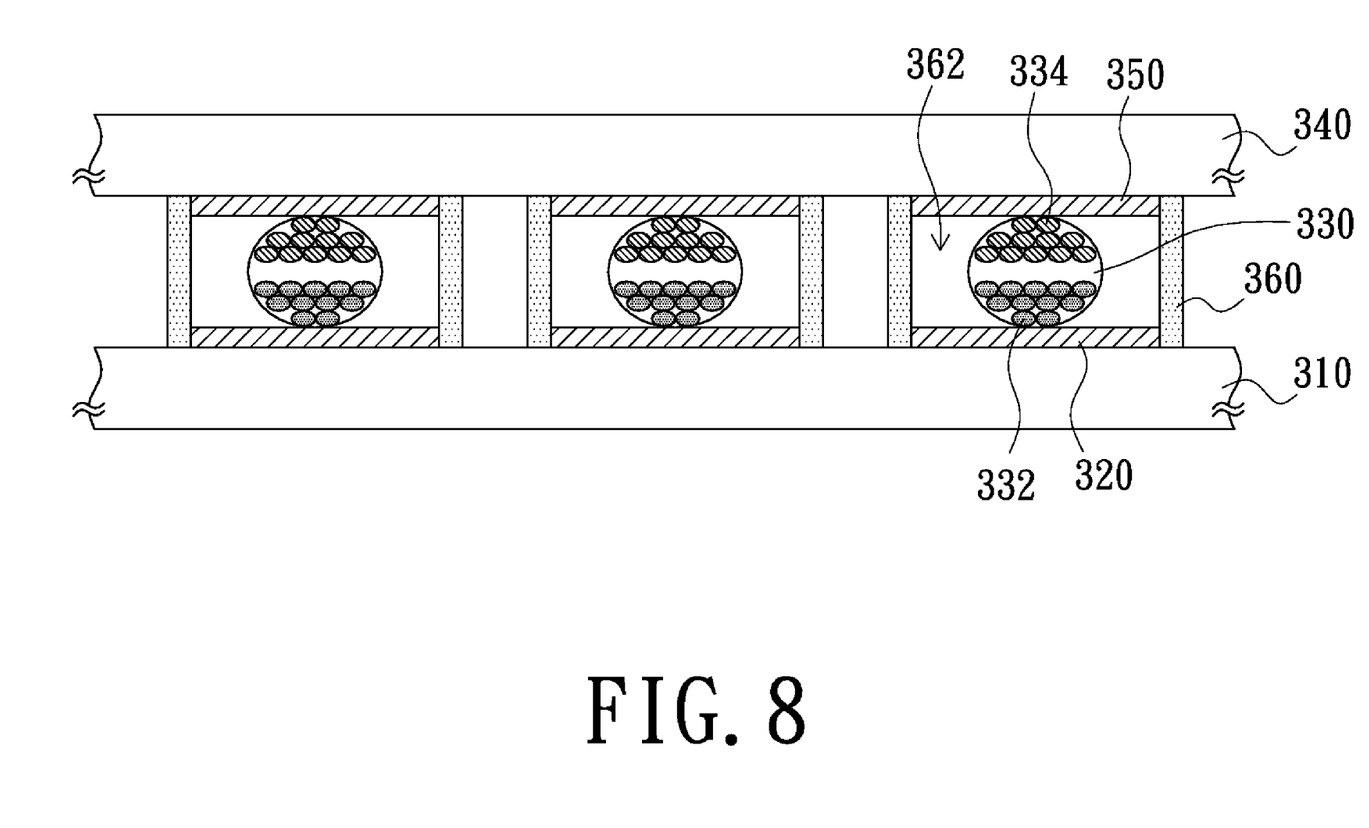
FIG. 8 is a schematic cross-sectional view of an electrophoretic display of one embodiment of this invention.

In another embodiment of this invention, the barrier structure 360 may be used to achieve the same efficacy with the light-shielding layer 370. FIG. 8 is a schematic cross-sectional view of an electro-phoretic display of another embodiment of this invention. Referring to FIG.8, the barrier structure 360 disposed on the first substrate 310 extends to the second substrate 340 and may be made of resin, graphite, electroless plating nickel, chromium or other light-shielding materials. Thus, the barrier structure 360 of the embodiment is not only used for fixing the positions of the electro-phoretic displaying units 330 on the first substrate 310, also has the same light-shielding efficacy with the light-shielding layer 370 of the aforementioned embodiment.

The electro-phoretic display of this invention will be described according to one of the aforementioned embodiments and figures thereinafter.

Referring to FIG. 3D again, electro-phoretic display 300 comprises the first substrate 310, the pixel electrodes 320, the electro-phoretic displaying units 330, the second substrate 340 and the transparent electrode 350. The pixel electrodes 320 are arranged in a matrix form on a first substrate 310. In this embodiment, the electro-phoretic display 300 is, for example, an active matrix display uses a plurality of thin film transistors (TFTs) as driven elements, so there are not only pixel electrodes 320 disposed on the first substrate 310, but also data lines 312, scan lines 314 and the thin film transistors 316. The electrical relationships of those are described in the preceding paragraphs, so it doesn't give unnecessary detail herein.

The electro-phoretic displaying units 330 are disposed on the pixel electrodes 320 and each electro-phoretic displaying unit 330 of this embodiment comprises a plurality of colored charged particles 332, such as red, green or blue charged particles. In more detail, each electro-phoretic displaying unit 330 of this embodiment also comprises a plurality of black charged particles 334. In another embodiment, each electro-phoretic displaying unit 330 of this embodiment comprises a plurality of colored charged particles 332 such as cyan, yellow or magenta charged particles, and also comprises a plurality of white charged particles 336, as shown in FIG. 4.

Figure 9:
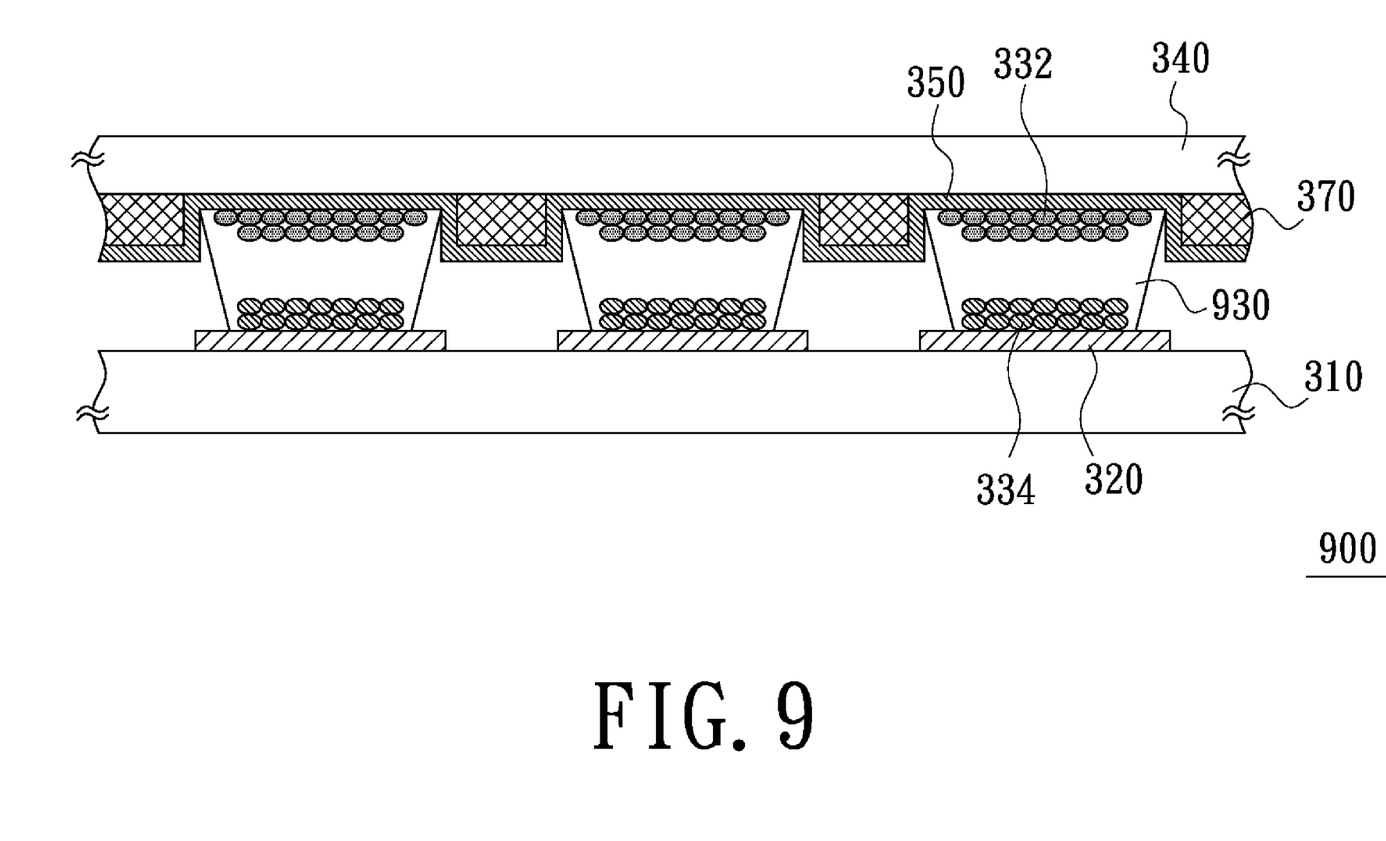
FIG. 9 is a schematic cross-sectional view of an electrophoretic display of one embodiment of this invention.

In addition, the electro-phoretic displaying units 330 of the electro-phoretic display of this invention may be electro-phoretic microcapsules as shown in FIG. 3D or be electro-phoretic microcups as shown in FIG. 9. This invention is not limited hereto.

Referring to FIG. 3D again, each pixel electrode 320 corresponds to several colored charged particles 332 with the same color. Specifically, there may be a single electro-phoretic displaying unit 330 or a plurality of electro-phoretic displaying units 330 having colored charged particles 322 with the same color (as shown in FIG. 6) on each pixel electrode 320. In the other words, the pixel electrodes 320 are used for driving the electro-phoretic displaying units 330 having colored charged particles 322 with a color, respectively.

Besides, each electro-phoretic displaying unit 330 may be disposed on a plurality of the pixel electrodes 320, as shown in FIG. 7. In this embodiment, each electro-phoretic displaying unit 330 is disposed on two pixel electrodes 320. Thus, each electro-phoretic displaying unit 330 is driven by two pixel electrodes 320.

As shown in FIG. 3D, the electro-phoretic display 330 of this embodiment further comprises the barrier structure 360 disposed on the first substrate 310 for partitioning a plurality of containing spaces 362 thereon. The electro-phoretic displaying units 330 are disposed into the containing spaces 362 one-to-one.

The second substrate 340 is disposed above the electro-phoretic displaying units 330. In this embodiment, the light-shielding layer with a plurality of openings 372 is disposed on the second substrate 340. The transparent electrode 350 located between the second substrate 340 and the electro-phoretic displaying units 330 is disposed on the light-shielding layer with the result that filled into the openings 372. Since the openings 372 of the light-shielding layer 370 correspond to the containing spaces 362 partitioned on the first substrate 310 by the barrier structure 372 one-to-one, the light emitted from the electro-phoretic display 300 may be prevented from mixing. Therefore, the chromatic contrast of the image displayed by the electro-phoretic display 300 may be improved.

As shown in FIG. 9, in the electro-phoretic display 300 with electro-phoretic microcups 930, the light-shielding layer 370 is also used for improving the contrast of the displayed image.

In another embodiment of this invention, the barrier structure 360 disposed on the first substrate 310 also may be used for improving the contrast of display. Referring to FIG. 8, the barrier structure 360 disposed on the first substrate 310 extends from the first substrate 310 to the second substrate 340, and is made of resin, graphite, electroless planting nickel, chromium or other light-shielding materials to achieve the same efficacy with the light-shielding layer 370 in FIG. 3D.

In summary, each pixel electrode only controls the electro-phoretic displaying units having the colored charged particles with one color in the electro-phoretic display of this invention. Thus, the electro-phoretic display of this invention can select a part of the pixel electrodes for being driven according to the color of the image being displayed. Therefore, if the electro-phoretic displaying units with the colored charged particles having the same color are selected, the electro-phoretic display can display single-color images. Accordingly, the electro-phoretic display of this invention may have an improved chromatic performance.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An electro-phoretic display, comprising:
a first substrate;
a plurality of pixel electrodes arranged in a matrix form on the first substrate;
a plurality of electro-phoretic displaying units disposed on the pixel electrodes, each electro-phoretic displaying unit comprising a plurality of colored charged particles, wherein each pixel electrode corresponds to at least one of the electro-phoretic displaying units having the colored charged particles with the same color, wherein the colored charged particles are red, green or blue charged particles, and wherein each electro-phoretic displaying unit further comprises a plurality of black charged particles;
a second substrate disposed above the electro-phoretic displaying units;
a transparent electrode disposed on the second substrate and between the second substrate and the electro-phoretic displaying units; and
a light-shielding layer having a plurality of openings filled with the transparent electrode, wherein each of the openings corresponds to one of the electro-phoretic displaying units.

2. The electro-phoretic display as recited in claim 1, wherein each electro-phoretic displaying unit is disposed on at least one of the pixel electrodes.

3. The electro-phoretic display as recited in claim 2, wherein each of the electro-phoretic displaying units is disposed on two corresponding pixel electrodes.

4. The electro-phoretic display as recited in claim 1, wherein the electro-phoretic displaying units comprise electro-phoretic micro-cups.

5. The electro-phoretic display as recited in claim 1, further comprising a barrier structure disposed on the first substrate and partitioning a plurality of containing spaces on the first substrate, wherein each electro-phoretic displaying units comprise electro-phoretic microcapsules and each of the electro-phoretic microcapsules is correspondingly disposed in one of the containing spaces.

6. The electro-phoretic display as recited in claim 5, wherein the barrier structure extends from the first substrate to the second substrate.

7. The electro-phoretic display as recited in claim 6, wherein the material of the barrier structure comprises light-shielding material.

8. The electro-phoretic display of claim 1, wherein the first substrate and the second substrate are respectively a glass substrate and a flexible substrate.

9. A fabricating method of an electro-phoretic display comprising the steps of:
forming a plurality of pixel electrodes arranged in a matrix form on a first substrate;
disposing a plurality of electro-phoretic displaying units on the pixel electrodes, wherein each electro-phoretic displaying unit comprises a plurality of colored charged particles, and each pixel electrode corresponds to a least one of the electro-phoretic displaying units having the colored charged particles with the same color, wherein the colored charged particles are red, green or blue charged particles, and wherein each electro-phoretic displaying unit further comprises a plurality of black charged particles;
forming a transparent electrode on a second substrate;
disposing the second substrate with the transparent electrode on the electro-phoretic displaying units to position the transparent electrode between the second substrate and the electro-phoretic displaying units; and
forming a light-shielding layer having a plurality of openings filled with the transparent electrode, wherein each of the openings corresponds to one of the electro-phoretic displaying units.

10. The method as recited in claim 9, wherein the step of disposing the electro-phoretic displaying units on the pixel electrodes comprises the step of disposing the electro-phoretic displaying units with the colored charged particles having the same color on each pixel electrode, respectively.

11. The method as recited in claim 9, wherein the step of disposing the electro-phoretic displaying units on the pixel electrodes comprises the step of disposing each electro-phoretic displaying unit on at least one of the pixel electrodes.

12. The method as recited in claim 9, further comprising the step of forming a barrier structure disposed on the first substrate to partition a plurality of containing spaces on the first substrate before disposing the electro-phoretic displaying units comprising electro-phoretic microcapsules on the pixel electrodes, wherein each electro-phoretic microcapsule is disposed in corresponding one of the containing spaces.

13. The method as recited in claim 12, wherein the barrier structure extends from the first substrate to the second substrate.

14. The method as recited in claim 13, wherein the material of the barrier structure comprises light-shielding material.

15. An electro-phoretic display, comprising:
a first substrate;
a plurality of pixel electrodes arranged in a matrix form on the first substrate;
a plurality of electro-phoretic displaying units disposed on the pixel electrodes, each electro-phoretic displaying unit comprising a plurality of colored charged particles, wherein each pixel electrode corresponds to at least one of the electro-phoretic displaying units having the colored charged particles with the same color, wherein the colored charged particles are cyan, yellow or magenta charged particles, and wherein each electro-phoretic displaying unit further comprises a plurality of white charged particles;

a second substrate disposed above the electro-phoretic displaying units;

a transparent electrode disposed on the second substrate and between the second substrate and the electro-phoretic displaying units; and a light-shielding layer having a plurality of openings filled with the transparent electrode, wherein each of the openings corresponds to one of the electro-phoretic displaying units.

16. The electro-phoretic display as recited in claim 15, wherein each of the electro-phoretic displaying units is disposed on two corresponding pixel electrodes.

17. A fabricating method of an electro-phoretic display comprising the steps of:

forming a plurality of pixel electrodes arranged in a matrix form on a first substrate;

disposing a plurality of electro-phoretic displaying units on the pixel electrodes, wherein each electro-phoretic displaying unit comprises a plurality of colored charged particles, and each pixel electrode corresponds to at least one of the electro-phoretic displaying units having the colored charged particles with the same color, wherein the colored charged particles are cyan, yellow or magenta charged particles, and wherein each electro-phoretic displaying unit further comprises a plurality of white charged particles;

forming a transparent electrode on a second substrate;

disposing the second substrate with the transparent electrode on the electro-phoretic displaying units to position the transparent electrode between the second substrate and the electro-phoretic displaying units; and forming a light-shielding layer having a plurality of openings filled with the transparent electrode, wherein each of the openings corresponds to one of the electro-phoretic displaying units.

18. An electro-phoretic display, comprising:

a first substrate;

a plurality of pixel electrodes arranged in a matrix form on the first substrate;

a plurality of electro-phoretic micro-cups disposed on the pixel electrode, each electro-phoretic micro-cup comprising a plurality of colored charged particles, wherein each pixel electrode corresponds to at least one of the electro-phoretic displaying micro-cups having the colored charged particles with the same color, wherein the colored charged particles are red, green of blue charged particles, and wherein each electro-phoretic micro-cup further comprises a plurality of black charged particles;

a second substrate disposed above the micro-cups; and a transparent electrode disposed on the second substrate and between the second substrate and the electro-phoretic micro-cups.

19. An electro-phoretic display, comprising:

a first substrate;

a plurality of pixel electrodes arranged in matrix form on the first substrate;

a plurality of electro-phoretic displaying units disposed on the pixel electrodes, each electro-phoretic displaying unit comprising a plurality of colored charged particles, wherein each pixel electrode corresponds to at least on of the electro-phoretic displaying units having the colored charged particles with the same color, wherein the colored charged particles are red, green or blue charged particles, and wherein each electro-phoretic displaying unit further comprises a plurality of black charged particles;

a second substrate disposed above the electro-phoretic displaying units;

a transparent electrode disposed on the second substrate and between the second substrate and the electro-phoretic displaying units; and a barrier structure disposed on the first substrate and partitioning a plurality of containing spaces on the first substrate, wherein the electro-phoretic displaying units comprise electro-phoretic microcapsules and each of the electro-phoretic microcapsules is correspondingly disposed in one of the containing spaces.

20. An electro-phoretic display, comprising:

a glass substrate;

a plurality of pixel electrodes arranged in a matrix form on the glass substrate;

a plurality of electro-phoretic displaying units disposed on the pixel electrodes, each electro-phoretic displaying unit comprising a plurality of colored charged particles, wherein each pixel electrode corresponds to at least one of the electro-phoretic displaying units having the colored charged particles with the same color, wherein the colored charged particles are red, green or blue charged particles, and wherein each electro-phoretic displaying unit further comprises a plurality of black charged particles;

a flexible substrate disposed above the electro-phoretic displaying units; and a transparent electrode disposed on the flexible substrate and between the flexible substrate and the electro-phoretic displaying units.

* * * * *